Sept. 20, 1927.

J. J. BARRY 1,642,802

FISH SCALER

Filed Nov. 6, 1925

INVENTOR
James J. Barry
BY
King & Schlat
ATTORNEYS

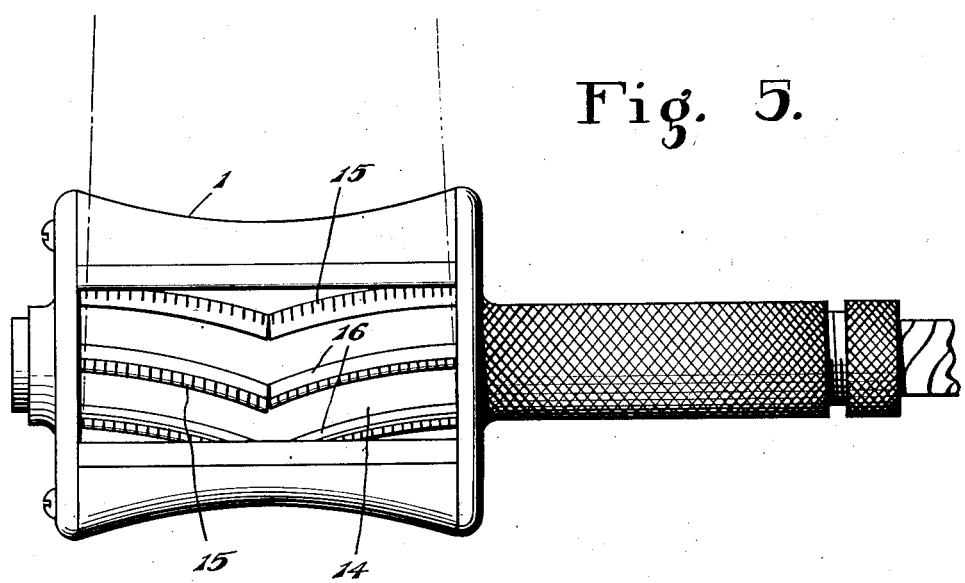
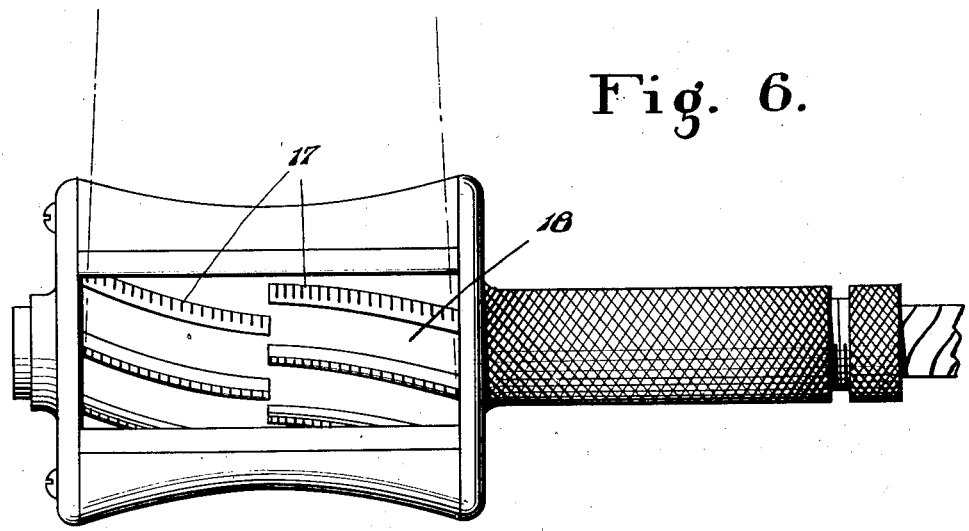

Patented Sept. 20, 1927.

1,642,802

UNITED STATES PATENT OFFICE.

JAMES J. BARRY, OF GLOUCESTER, MASSACHUSETTS, ASSIGNOR TO GENERAL SEAFOODS CORPORATION, OF GLOUCESTER, MASSACHUSETTS, A CORPORATION OF DELAWARE.

FISH SCALER.

Application filed November 6, 1925. Serial No. 67,282.

This invention relates to fish scalers, and the disclosure herein has reference more particularly to application of the said invention to power driven fish scalers.

The objects of the invention are to provide a fish scaler having a rotating flexible blade; to provide a blade which will take care of inequalities in the fish being scaled; to thus provide a blade which will scale an entire fish effectively and rapidly; to provide a blade which will not bind when engaging obstructions such as a fin; to provide a fish scaler of appropriate shape for engaging a considerable area of the fish at one time; to obtain a screw action of the teeth of the successive blades acting oppositely outward from the center; to obtain a similar screw action by providing such blades which are oppositely spiral from a middle part of the drum; to prevent the teeth from digging into the flesh of the fish; to provide means for attaching the blades; to provide readily replaceable teeth; to remove the loosened scales from the housing and from the fish; to secure simplicity of construction and operation; and to obtain other advantages and results as may be brought out in the following description.

Referring to the accompanying drawings in which like numerals of reference indicate similar parts throughout the several views.

Figure 3:
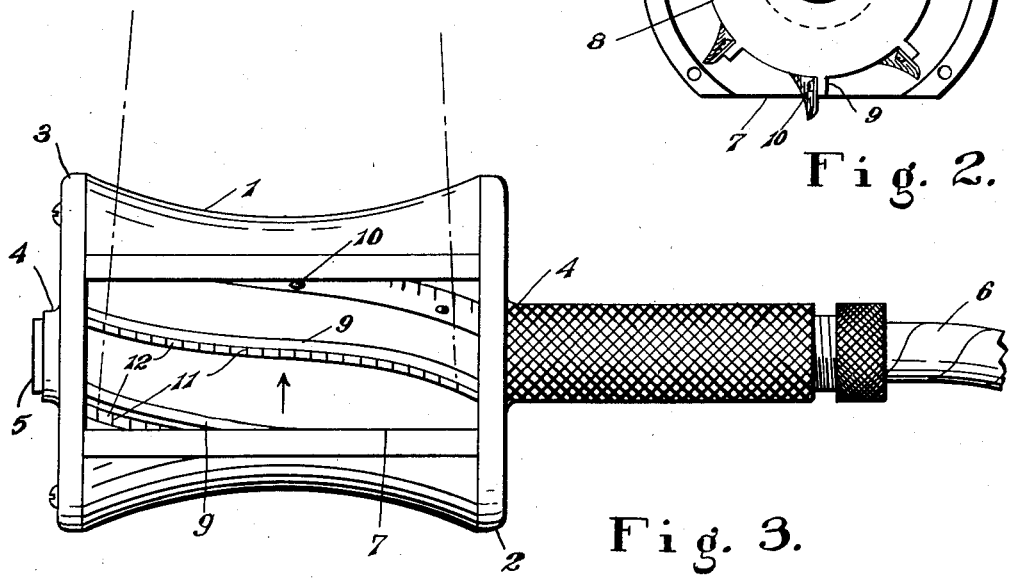
Figure 3 is an underneath view of the fish scaler.

Figures 5 and 6 are underneath views similar to Fig. 3 showing modified constructions.

Figure 1:
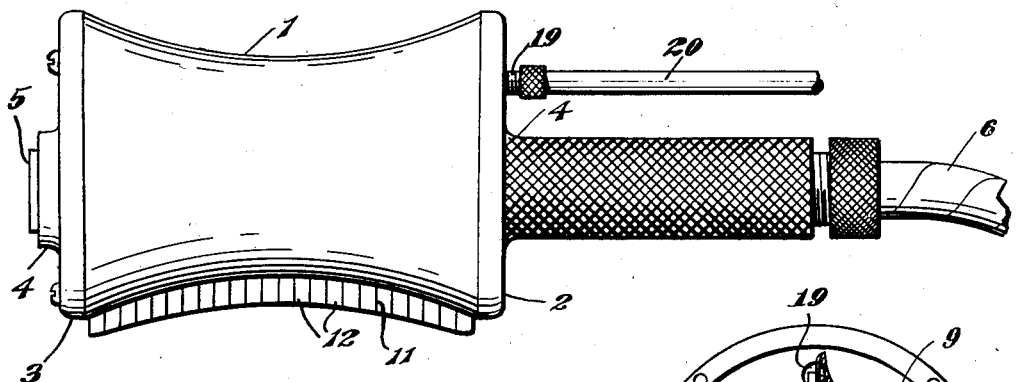
Figure 1 is a side elevation of a scaler embodying my invention.
Figure 2:
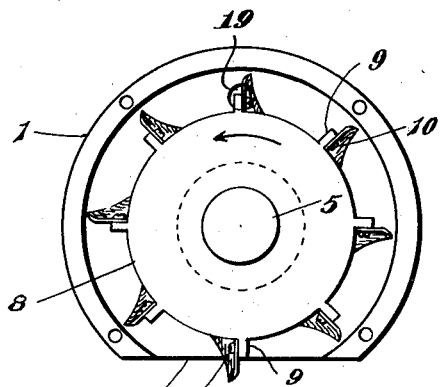
Figure 2 is an end view of the same with the end cap removed.

In the specific embodiment of the invention illustrated in said drawings, the reference numeral 1, indicates a substantially symmetrical housing shown with one fixed end 2 and a removable end 3. Said removable end 3 has been taken off in Figure 2 to disclose the interior construction. The opposite ends 2, 3 provide central bearings 4 for rotatably mounting a shaft 5 which extends axially through said symmetrical housing and is driven by any suitable connection at one end thereof, as by a suitable flexible shaft 6, in turn driven from an appropriate source of power, such as an electric motor (not shown). One longitudinal side portion of the housing 1 is cut away, thereby providing a longitudinal opening 7 through which the blades (hereinafter described) may operate.

Shaft 5 is preferably enlarged within the housing 1, or has thereon a core or rotating drum 8 which is preferably largest at its ends and curves inwardly to a smaller diameter at its middle part, concave in shape similar to a windlass or winch. The casting or housing 1, also may have a similar shape if so desired, the important feature of the construction being that the under-side of the casing is provided with a longitudinal opening 7 and has a concave shape so as to not only fit over the fish but to enable the blades to project beyond the housing for the entire length of the blades.

Said drum 8 furthermore provides a plurality of outwardly projecting ribs 9 extending lengthwise of the said drum and arranged spirally with respect to the axis so that one end will come past the opening in the housing before the other does. The blades are mounted on the drum projecting outwardly therefrom by being clamped to the said ribs 9, as by screws 10, said blades preferably being quite thin and flexible.

Figure 4:
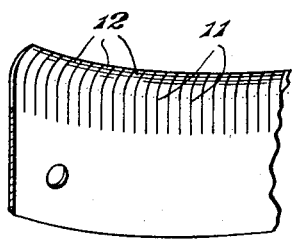
Figure 4 is a perspective view of a portion of one of the blades.

The blades, as indicated in the several views and particularly Figure 4, are preferably sub-divided longitudinally. One means of obtaining such longitudinal sub-division is by cutting the blade inwardly at its edge, as at 11, the cuts being as close together as desired so as to provide narrow teeth 12 which can flex independently of each other and thus enable the blade to take care of inequalities on the surface of the fish and to ride over such obstructions as the fish fin without detriment to the fish or to the fish scaler. It is to be understood, however, that while I have shown the teeth 12 as positioned very close together and as integral parts of a single blade, it is within the contemplation of this invention to vary this construction as may be found desirable or necessary. Furthermore, the outer ends of the teeth or outer edge of the blades are bent or deflected backward with respect to the direction of rotation of the drum, as clearly indicated in Figures 2 and 4, the drum rotating in the direction indicated by the arrow in Figure 2 so as to drag the teeth across the fish and prevent them from digging into the fish.

The assembled blades are preferably so constructed and arranged that the corresponding teeth on successive blades are offset from a plane of rotation, each a little further, so that there is a screw action of the teeth as the drum rotates. Furthermore, this arrangement is preferably such as to obtain an outward screw action in opposite directions from the middle or smallest part of the drum. This offsetting of corresponding teeth and successive blades by which this oppositely outward screw action is obtained not only is advantageous in removal of the scales from their position on the fish, but also operates to discharge the scales from the ends of the scaler drum. This is of considerable advantage so the operator can see the scaled fish skin without the loose scales falling back on it in such number as to make it uncertain whether the fish has been completely scaled or not. The discharging screw effect may also be obtained by providing an opposite slope or spiral to the blades from the middle part of the drum outward. This feature is shown in Figure 5, wherein the same housing 1 is employed as in the previously described construction. Within the housing is a rotatable drum 14 having blades 15 secured to ribs 16 on the drum. As shown, these ribs and therefore the blades are oppositely spiral from a central plane, the spirals on both sides of said plane sloping in the same direction with respect to the direction of rotation.

In Figure 6 I have shown what may be termed "broken blades". As shown therein, blades 17 extend from one end of a drum 18 to substantially a middle plane, and the blades from the other end come also to substantially the same plane but are midway between the first mentioned blades.

In any event, I prefer to provide means for supplying water to the interior of the housing for both flushing the scales from the interior and for washing the scales from the fish. Such means I have illustrated as a nipple 19 to which may be attached a hose 20 from a suitable source of supply.

Obviously other detail changes and modifications may be made in the manufacture and use of my improved scaler and I do not wish to be understood as limiting myself to the exact structure shown except as set forth in the following claims when construed in the light of the prior art.

Having thus described the invention, I claim:—

1. A fish scaler having a housing and rotating shaft, and blades rotatable with said shaft, said blades having subdivisions independently flexible.

2. A fish scaler having a housing and rotating shaft, and flexible helical blades rotatable with said shaft, said blades having subdivisions independently flexible.

3. A fish scaler having rotating blades longitudinally sub-divided, and having corresponding sub-divisions on opposite sides of a middle plane of rotation offset from said plane those on one blade further than the corresponding ones on the next successive blade so as to provide outwardly opposite screw action of the said sub-divisions as the blades are rotated.

4. A fish scaler having a concave rotating member, and concave spiral blades on said member.

5. A fish scaler having a concave rotating member, and concave spiral flexible blades on said member.

6. A fish scaler having a concave rotating member, and narrow independently flexible fish engaging scaling means projecting from said rotating member.

7. A fish scaler having a rotating member, and blades projecting from said member, said blades being spirally arranged on opposite sides of a middle plane sloping in the same direction with respect to the direction of rotation on opposite sides of said plane.

8. A fish scaler having a rotating member, and blades projecting from said member, blades extending along said member from the ends thereof toward the middle, the blades from each end terminating substantially at the middle of said member with the blades from one end positioned intermediate of the blades from the other end.

9. A fish scaler comprising means for removing scales from a fish, and means connected to the scaler for supplying a flow of water thereto for washing the scales from said scaler and said fish.

10. A fish scaler having a rotatable member, blades on said member sloping in one general direction from a middle part of said member outwardly toward one end of said member, and other blades sloping in another general direction from a middle part of said member outwardly toward the other end of said member.

JAMES J. BARRY.